PUSHER PLATE UNLOADED POSITION

PUSHER PLATE FULLY COMPRESSED

Inventors
Ramiz Y. Hermiz
Donald J. Mickus
Richard J. Myers
Attorney

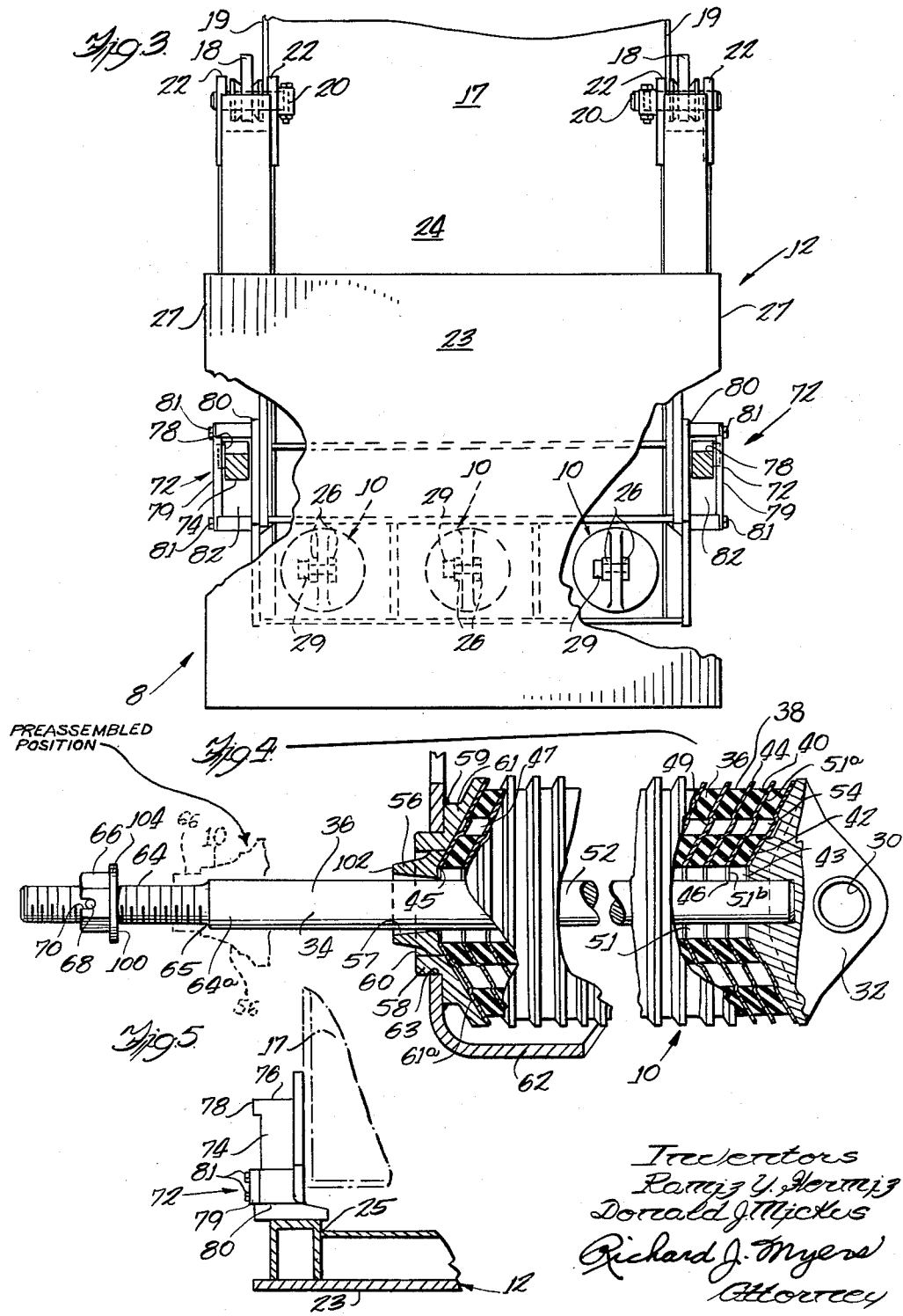

March 29, 1966  R. Y. HERMIZ ET AL  3,243,203
CUSHION BUMPER FOR VEHICLE
Filed Aug. 29, 1963  3 Sheets-Sheet 3

United States Patent Office 3,243,203
Patented Mar. 29, 1966

3,243,203
CUSHION BUMPER FOR VEHICLE
Ramiz Y. Hermiz, Maywood, and Donald J. Mickus, Chicago, Ill., assignors to International Harvester Company, Chicago, Ill., a corporation of New Jersey
Filed Aug. 29, 1963, Ser. No. 305,359
8 Claims. (Cl. 280—481)

This invention relates to vehicle bumpers having shock absorbing characteristics and more in particular relates to a cushioned bumper structure suited for the earth working vehicles.

The present invention is particularly adapted for vehicles used in a pushing operation. Where one vehicle is required to be pushed by another vehicle, bumper means may be employed on either the pushing vehicle or the pushed vehicle, such that the bumper means acts as a shock absorber. Thus, it will be appreciated that the pushing vehicle can contact the pushed vehicle at greater speeds by the employment of a bumper means between the two vehicles.

It is therefore a general object of this invention to provide a new, improved and novel bumper arrangement for delivery of motion from a pushing vehicle to a pushed vehicle in a smooth and even manner substantially eliminating or reducing impact shock resulting from contact between the two vehicles.

Another object of this invention is to provide a cushion or shock absorbing bumper arrangement for mounting on the forward end or rearward portion of a vehicle such as a crawler tractor or other earth working vehicle.

Another object of the invention is to provide a preloaded, preassembled shock absorbing cushion unit for mounting on a bumper arrangement of a vehicle.

A further object of this invention is to provide a shock absorbing or cushion bumper arrangement that is mounted to a vehicle by the use of novel mounting structure.

Another object of this invention is to provide a novel shock absorbing or cushion bumper construction having resilient means or elastomeric cushion arranged to receive both compressive and shearing forces transmitted as a result of impact with resultant increased life of the resilient means of the bumper, the resilient means being capable of receiving a greater number of impact loads as a result of stacking of its generally cone-shaped resilient components.

Another object of this invention is to provide a preassembled cushion bumper unit which may be quickly and easily attached to and detached from a vehicle.

Still another object is to provide for cushion unit construction which is not fixed at its outer or free end and thus eliminates major tension loads within the cushion unit.

A still further object of this invention is to provide a novel cushion bumper construction for attachment to a vehicle wherein a stop mechanism is provided for increasing the life of the components of the cushion bumper unit.

A still further object of this invention is to provide a bumper arrangement having a plurality of axially aligned resilient cone-shaped disk members constrained against transverse slipping of one disk member with respect to the other.

These and further objects will become more readily apparent from a reading of the description when examined in conjunction with the accompanying sheets of drawings.

In the drawings:

FIGURE 3 is an enlarged sectional view in front elevation of the vehicle pusher plate and bumper arrangement;

FIGURE 4 is a partial side elevational view partly in section of the novel bumper arrangement;

FIGURE 5 is a partial plan sectional view of the stop mecahnism for the front bumper arrangement;

The use of bumper arrangements generally has been known. The bumper finds common usage on vehicles of the crawler-tractor type and is so disposed between the vehicle chassis and the pusher element of the vehicle that engages an earth-moving scraper for moving the latter and is also disposed at the rear end of the crawler vehicle as a shock absorber when the crawler tractor vehicle is engaged at its rearward end by another crawler tractor vehicle to aid in moving of a scraper as, for instance, disclosed in U.S. Patent No. 3,079,176.

Figure 1:
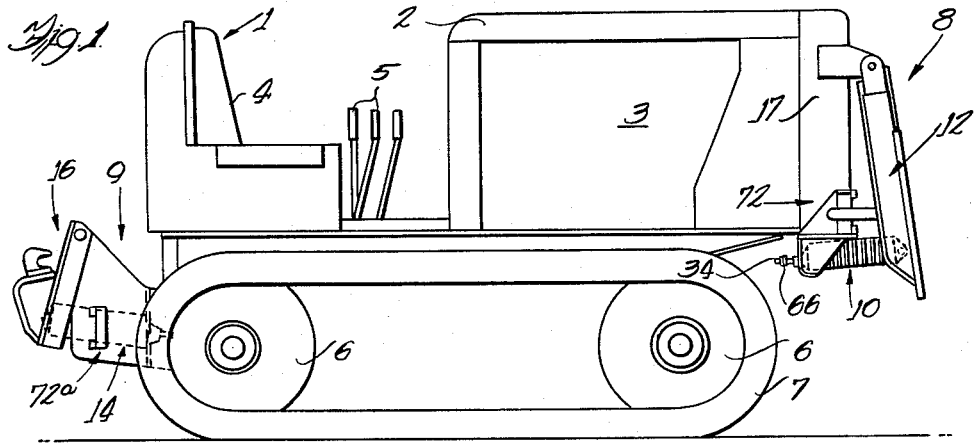
FIGURE 1 is a side elevational view of an earth working vehicle such as a crawler tractor employing the novel construction of both front and rear mounted bumper arrangements.

With reference now to the figures of the drawings and in particular FIGURES 1 through 5, there is shown in FIGURE 1 a vehicle 1 of the crawler-tractor type having an engine housing 2 enclosing an engine 3, an operator's seat 4, operator controls 5 supported on ground-engaging structure on either side of the vehicle including wheels 6, 6 and endless track 7. The vehicle 1 is provided at the front end with a cushion pusher 8 which includes a plurality of front cushion units 10 and a front pusher unit 12 and at the rearward end has a cushion push block 9 including a rear cushion unit 14 and a bumper assembly 16.

With reference now to FIGURES 2, 3, 4 and 5, it is seen that the front pusher unit 12 is mounted on the radiator guard 17 in front of the engine housing 2 by a front plate bracket 18 by welds 18a on either side 19 of the radiator guard 17. The outer end of the bracket 18 receives pivot pin 20 which passes through lugs or ears 22 of the push plate or element 24 which has a front wall 23, sidewalls 27, and rear wall 25. Lugs 26 on back of plate 23 receives cushion pivot pin 29 of the cushion unit 10 which passes through the eye or bore 30 of the pivot part or portion 32 of the rod assembly 36 which has a rod or shaft part or portion 34 extending rearwardly and about which is located a flexible cylindrical unit 38 comprising a series of outer elastic tubular disks 40 of rubber or elastomeric material defining an axially-extending opening 47 and being concentric with the shaft 34. A series of inner tubular disks 42 of elastomeric or rubber material lie within and are concentric with the outer disks 40 and define a bore or opening 43, the inner disks 42 being also concentric with the shaft 34. A plurality of metal rings 44 are alternately stacked between successive inner and outer tubular disks and have their outer ends or periphery extending slightly above the outer periphery of the outer disk and each metal ring has a bore or opening 46 having sliding engagement with the outer periphery 52 of the shaft 34, the preload compression of the rubber disks holding the disks in their position. Each metal ring 44 is cone or V-shaped, the apex of the cone facing rearwardly and has a portion 49 offset with respect to the rest of the ring and engaging the inner bore or channel 47 of the outer tubular disk 40 and the outer bore or periphery of the inner disk 42. Each inner disk 42 is offset slightly rearwardly and below a respective outer disk 40 and both disks 40 and 42 present rearwardly sloping surface portions to define with the metal rings 44 which are also sloped rearwardly a plurality of concave or cone-shaped radially extending segments of elastomeric disks and metal rings, each metallic ring 44 being bonded to the front facing surfaces of the concentric annular segments or disks 40, 42. The most forward concave metallic ring 44 is against the rearward surface of the pivot portion or part 32 with the portion 49 of ring 44 fitting into a groove 54 on the back of the pivot part 32 and the most rearward ring 44 has its inner end 45 welded to the cylindrical casting or collar 56. It is noted that the back of the pivot part is also V-shaped or conical shaped to act as a seat for the flexible cylindrical unit 38 of alternate rubber disks 40, 42 and metal rings 44. The axial concentric channel 47 is defined by the inner and outer peripheries of their respective elastomeric disks 40, 42 through which pass the ring portions 49. Each ring, in addition to having the outer sloping portion 51a, has a vertical portion 51b defining the bore 46 and lying within channel 51 extending axially and defined by the inner periphery of the inner disk 42 and the outer periphery of the shaft 34. The collar 56 has a bore 57 concentric with and slightly larger than the shaft 34 and has an outer peripheral surface engaging with the bore 60 of an annular retainer 58 concentric with the shaft 34. The retainer 58 is received in bore 63 of bracket 62 and has an upwardly diagonally extending portion 61 at its outer periphery which may be welded by weld 59 to retainer bracket 62 connected to the radiator guard 17. The inner concave face 61a of retainer 61 presents a seat for the most rearward ring 44. The rod 34 has a rearward threaded end 64 of slightly less diameter than the forward shaft portion 64a to define a shoulder 65 therewith and receiving limit or stop means such as a nut 66 adjacent pin opening 70 in the rod 34 for receiving pin 68 to constrain the nut against movement on the threaded end 64.

A front stop structure 72 comprising a stop arm 74 and a stop bracket 80 is located at the side 19 of the radiator guard 17. The stop arm 74 is secured to the rear wall 25 of the push plate 24 and extends rearwardly between the stop bracket 80 and the stop cover plate 79 bolted to the bracket 80 by bolts 81, the arm 74 passing through opening 82 and having a stop lug 78 at its rear end for engagement with the edge of the plate 79.

Figure 6:
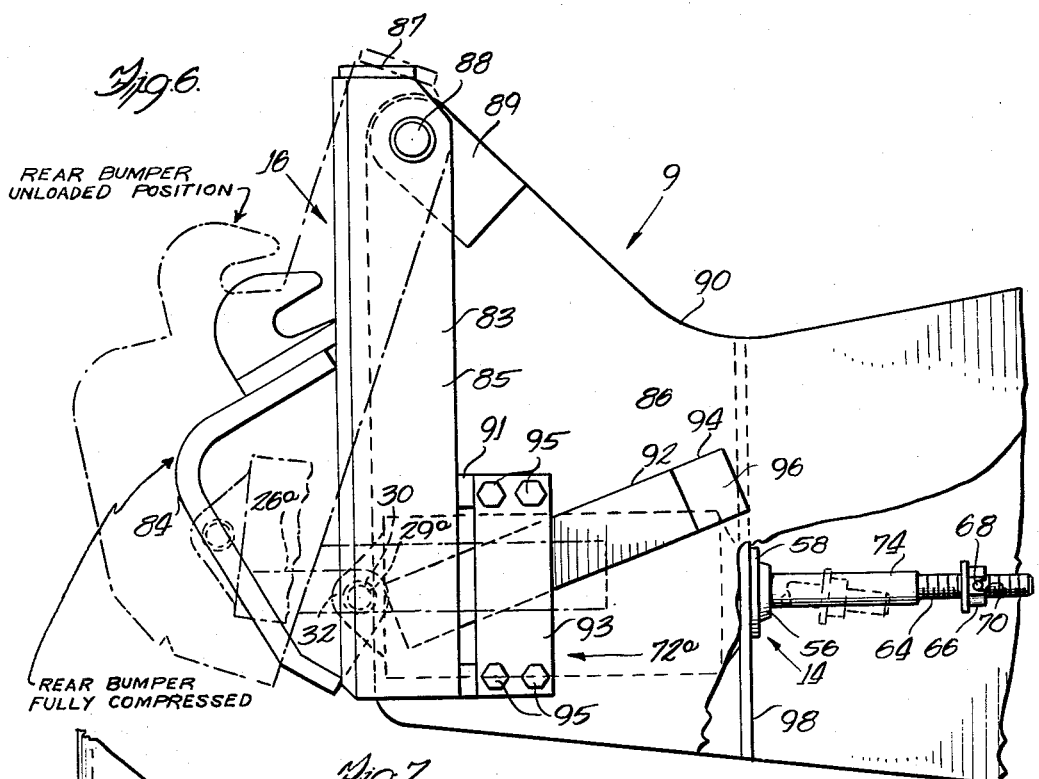
FIGURE 6 is a partial elevational view of the rear mounted bumper arrangement.
Figure 7:
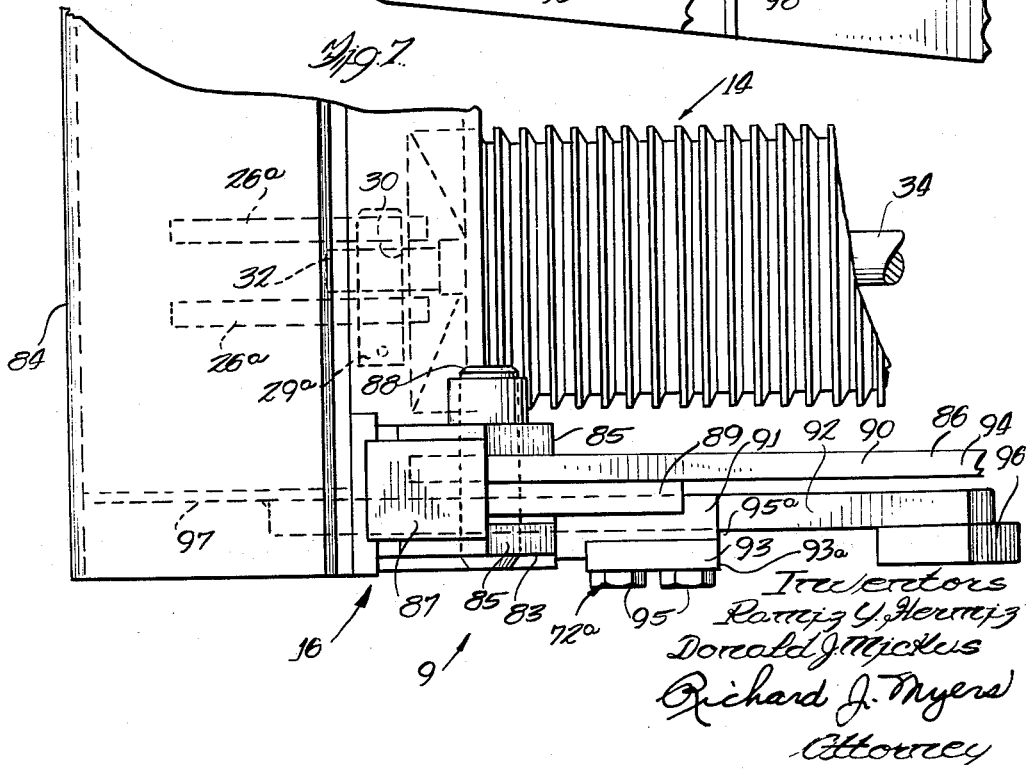
FIGURE 7 is a plan view of the rear section of the vehicle illustrating the bumper arrangement.

Referring now to FIGURES 6 and 7, the bumper assembly 16 located at the rear of the vehicle or tractor 1 comprises the bumper 84 and the arm assembly 83 which is integrally connected thereto, the arm assembly having a pair of arm plates 85 on each side of the rear portion of the vehicle and connected to a cover plate 87 on each side of the vehicle. The arm assembly is pivotally attached to the upper portion of the rear frame assembly 86 of the cushion push block 9 by means of pivot pin 88 held in pivot doubler plate 89 mounted on the sidewall 90 of the frame assembly. A rear stop structure 72a has a bracket 91 adjacent the doubler plate 89 and welded to sidewall 90 and has a cover plate 93 bolted thereto by bolts 95 and defining a passage 95a through which extends stop arm 92 attached at its rearward end to bumper bracket 97 on the bumper 84 and at its forward end 94 has an outwardly projecting stop lug 96 arranged for engagement with the forward side 93a of the cover plate 93. Each of a plurality of rear cushion units 14 (only one being shown, the rest being placed like in the case of the pusher 8) has its annular retainer 58 housed within and held by support wall 98 at the forward end of the unit 14, the rearward portion of the unit 14 being held by cushion pin 29a passing through the eye 30 of the unit 14 and through bumper lugs 26a affixed to the bumper 84.

Both cushion units 10 and 14 are similarly designed and therefore have the same reference characters. It will be appreciated that the inner and outer disks 40 and 42 may be constructed of other flexible material and the metal ring may be made of some other material.

Figure 2:
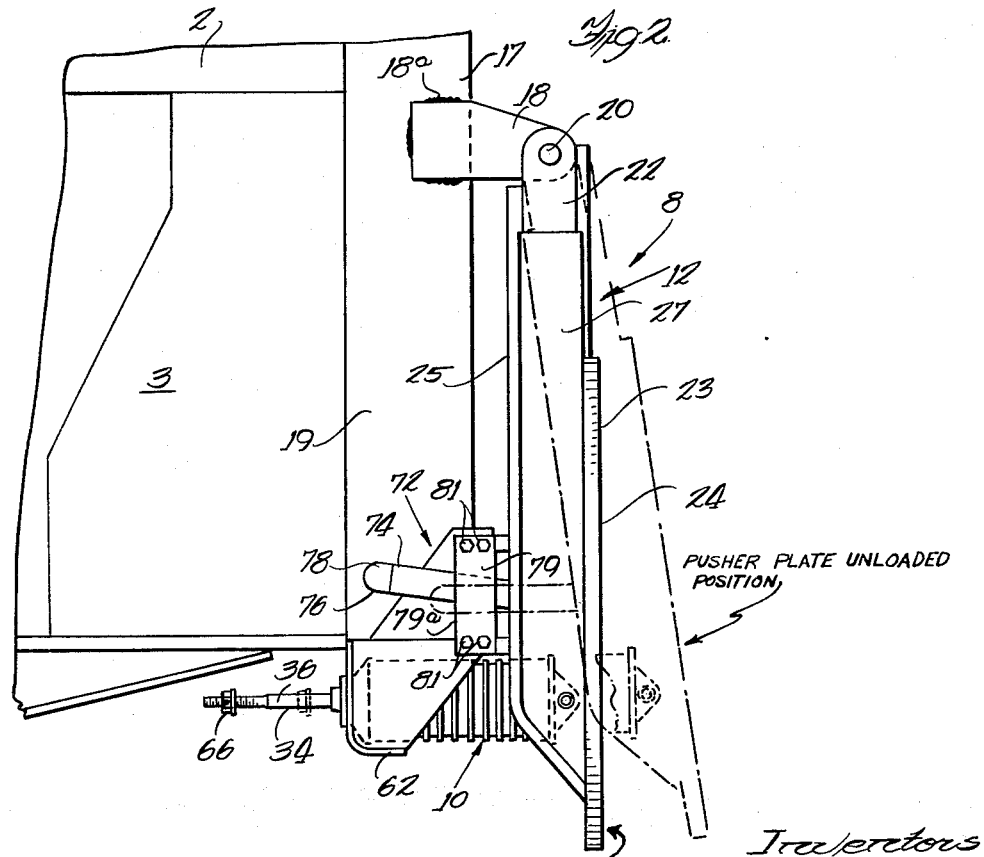
FIGURE 2 is an enlarged sectional view in side elevation of the front mounted bumper.

The cushion unit 10 or 14 has a preassembled position prior to installation on the vehicle 1 where the elastomeric disks assume a position as shown in FIGURE 4. In this preassembled compressed condition or position the nut 66 (partially illustrated in dotted lines) is so threaded on the shaft extension 64 that it has its forward facing surface 100 adjacent against the shoulder 65 and the collar 56 has its rearward face 102 abutting the forward face 100. In mounting the cushion unit 10 or 14 the eye 30 of the pivot portion 32 is aligned with the chosen lugs 26 or 26a and pivot pin 29 or 29a locks the pivot portion 32 to the pusher plate or bumper 24, 84 as the case may be, the rod portion 34 with nut 66 in said dotted position (FIGURE 4) against collar 56 having been extended through the retainer bore 60. Then the nut 66 is backed off toward the outer end of the threaded portion 64 to the position shown in FIGURES 1, 2, 4 or 6 allowing the pusher plate to assume the unloaded position as shown in FIGURE 2 or the bumper to assume the unloaded position as shown in FIGURE 6 wherein the nut 66 has its flanged portion face 100 just slightly somewhat outwardly of a respective bracket 62 or 98. The nut 66 is held on the shaft portion 64 in its position as shown by FIGURE 4 or 6 with the cotter pin 68 passing through the slot 70 of the nut 66 and through an opening in the shaft portion 64 for holding the nut 66 in the locked position. The bore 57 of the collar 56 has a smaller opening toward the inner part of the unit and widens divergingly outwardly to a wider opening at the outer end of the cushion unit to allow horizontal or vertical movement of the rod portion 34 in going from a compressed position to a relaxed position when assembled on the vehicle 1 as shown by FIGURES 2, 4 and 6. The only purpose of the nut 66 is to hold the cushion unit in a slightly compressed preassembled position, once the cushion unit is mounted on the vehicle, the nut need not be used since it never rests against the surface 102 of the collar 56 in the assembled position and can pass through the bore 60 of the retainer member 58 during assembly on the vehicle.

With the stop arm 74 or 83 positioned next as shown in FIGURE 2 or 6, plate 79 or 93 is fastened on stop bracket 80 or 91, the stop mechanism 72 or 72a protecting the cushion unit against damage by limiting the outward movement of the cushion unit away from the front or rear portion of the vehicle because of the stop lug 78 or 96.

The cushion units 10 and 14 may be disassembled by reversing the above referred procedure.

The stop mechanisms 72 and 72a absorb the spring return load caused by the load compressing the cushion unit and if not for the stop mechanisms 72 and 72a the nut 66 could engage with part 56 of shaft 36 to place wear on the nut, threads and shaft. Also the stop mechanisms 72 and 72a limit outward movement of the pusher or bumper plates which might otherwise hit the ground or become otherwise damaged.

It is to be noted that the cushion unit in the contracted condition, as a result of loading thereagainst, and as assembled on a vehicle assumes a horizontal position but in the expanded condition as assembled and as a result of only bumper loading on the vehicle, assumes a slightly upwardly sloping position whereas the stop element 74 or 94 assumes a downwardly sloping position in the contracted condition of the unit on the vehicle and assumes a somewhat horizontal position in the expanded condition of the unit assembled on the vehicle. Thus, the loading on the stop mechanism due to the expansion of the cushion unit is along the longitudinal axis of the stop unit and provides the strongest holding power provided by the stoparm in order to protect the cushion unit whereas when the cushion unit is compressed under a push load the loading on the cushion unit is axially of the unit taking advantage of the best compressibility features of the cushion unit. In the compressed position of the unit as assembled on the tractor due to engagement of the pusher or the bumper by the scraper or another vehicle, the unit is so constructed as to have excellent shock absorbing characteristics such that the compressive and shearing forces transmitted to the elastomeric disks 40 and 42 as a result of the impact result in increased life of the cushion unit and will so hold up under a great number of impact loads as a result of the stacking of the generally V-shaped or conical-shaped resilient elastomeric members 40, 42 axially on the shaft portion and perpendicular to the pushing force. Also, due to the conical shape of unit 38 not only is the shock taken up in generally axial displacement of the members 40, 42, 44 but the members tend to straighten vertically in compression from a conical form for absorbing the shock and providing smoother impact contact between the respective vehicles.

Thus, it can be seen that the objects of the invention have been fully achieved. Further modifications may be made in the structure shown without departing from the spirit of the invention nor the scope thereof as defined in the appended claims.

What is claimed is:

1. In a vehicle having a frame and a bumper pivotally connected to the frame, a cushion unit attached between the bumper and the frame and comprising a resilient member compressible between the frame and the bumper and urging the bumper away from the frame, the frame having an aperture therethrough and the member having an aperture therethrough generally aligned with the frame aperture, an element having opposed ends and extending through both apertures and having one end pivotally connected to the bumper and the other end extending beyond the member and the frame, said other end having limit means smaller than said frame aperture so as to be extendable through the frame aperture and engageable with the resilient member in limiting the expansion thereof, stop means on the vehicle having a first part mounted on the frame and a second part mounted on the bumper engageable with the first part in limiting movement of bumper away from the frame and preventing passage of the limit means through the aperture of the frame.

2. A bumper cushion means for a vehicle having a support and a bumper pivotally connected to the support and comprising outer and inner concentric sets of resilient stacked expandible tubular members between the support and the bumper and having opposed ends, and said sets of tubular members having an expanded unloaded condition and a compressed loaded condition, shaft means extending through said inner set and concentric with each set and including an outer portion engaging with one end of said sets and pivotally connected with the bumper, said support having retaining means engaging with the opposite end of the sets and having an aperture receiving the shaft means therethrough, said shaft means having limit means smaller than said aperture so as to be receivable through the aperture and movable along the shaft means from a position adjacent to the opposite end of the sets in the unloaded condition to a position outward of the retaining means in the loaded condition of the sets of tubular members.

3. The device described in claim 2 and further including stop means on the support and on the bumper and engaging with one another for limiting the expansion of said sets and holding the limit means outward of said retaining means.

4. A bumper cushion means for a vehicle having a support and a bumper pivotally connected to the support and comprising a resilient tubular member between the support and the bumper and having opposed ends, and said tubular member having an expanded unloaded condition and a compressed loaded condition, shaft means extending through said member and including an outer portion engaging with one end of said member, said support having an aperture therein, retaining means associated with said support aperture engaging with the opposite end of the member and having an aperture reciprocably receiving the shaft means therethrough, said shaft means having limit means smaller than said support aperture so as to be receivable through the support aperture and movable along the shaft means from a position adjacent to the opposite end of the member in the unloaded condition to a position outward of the retaining means in the loaded condition of the tubular member.

5. The device as described in claim 4 and further including stop means on the support and on the bumper for limiting the expansion of said member and holding the limit means outwardly of said retaining means.

6. In a vehicle having a cushion unit for a bumper pivotally attached to the vehicle framework, the improvement comprising a resilient compressible tubular member having a pair of opposed outer ends disposed between the framework and the bumper, an elongated element extending through the member and having a first end portion connecting with the bumper and engaging with one end of the member and a second free end portion extending outwardly of the member, cushion retaining means operatively connected with the framework and provided with a first aperture, collar means associated with said first aperture having a second aperture through which reciprocably extends the free end portion of the element, limit means smaller than said first aperture on the free end portion and movable therealong and through the first aperture from a first unloaded position adjacent to the other end of the member to a second loaded position outwardly of the cushion retaining means with the other end of the member engageable with the cushion retaining means.

7. The device as described in claim 6 wherein said second aperture is defined by surfaces diverging outwardly away from the first end portion allowing diagonally canting movement of the elongated element in its reciprocating movement through the second aperture.

8. The device as described in claim 6 and further including stop means on the vehicle having a first element associated with the framework and a second element associated with the bumper and engaging with the first element for preventing engagement of the limit means in the first position with the other end of the member.

References Cited by the Examiner

UNITED STATES PATENTS

| | | | |
|---|---|---|---|
| 2,445,723 | 7/1948 | Brown | 267—63 X |
| 2,986,827 | 6/1961 | Peterson | 280—481 X |
| 2,999,697 | 9/1961 | Winget | 280—481 |
| 3,022,587 | 2/1962 | Greeley | 37—159 |
| 3,079,176 | 2/1963 | Duke et al. | 280—481 |
| 3,114,540 | 12/1963 | Brake | 267—63 X |
| 3,158,944 | 12/1964 | Rehberg et al. | 267—63 X |

LEO FRIAGLIA, *Primary Examiner.*

BENJAMIN HERSH, *Examiner.*

R. C. PODWIL, *Assistant Examiner.*